US009516862B1

(12) United States Patent
Emilo

(10) Patent No.: US 9,516,862 B1
(45) Date of Patent: Dec. 13, 2016

(54) UNIFIED LENS ANIMAL GOGGLE

(71) Applicant: Jesse R. Emilo, Jackson, WY (US)

(72) Inventor: Jesse R. Emilo, Jackson, WY (US)

(73) Assignee: Rex Specs LLC, Wilson, WY (US)

( * ) Notice: Subject to any disclaimer, the term of this patent is extended or adjusted under 35 U.S.C. 154(b) by 184 days.

(21) Appl. No.: 14/615,957

(22) Filed: Feb. 6, 2015

Related U.S. Application Data

(60) Provisional application No. 61/985,287, filed on Apr. 28, 2014.

(51) Int. Cl.
*A01K 13/00* (2006.01)

(52) U.S. Cl.
CPC .................................. *A01K 13/006* (2013.01)

(58) Field of Classification Search
CPC .......... A01K 13/006; A61F 9/02; A61F 9/026; A61F 9/027; A61F 9/028
USPC . 119/850, 836, 856; D16/300, 311; 54/80.2; 2/426, 436, 15, 439, 452, 431, 2/432, 445, 435; 351/142, 62, 41, 47, 157, 351/124, 133
See application file for complete search history.

(56) References Cited

U.S. PATENT DOCUMENTS

| | | | | |
|---|---|---|---|---|
| 903,108 | A | * | 11/1908 | Rogers ................. A01K 13/006 119/850 |
| 2,407,029 | A | * | 9/1946 | Miller .................. A01K 13/006 119/850 |
| 3,924,388 | A | | 12/1975 | Morrison |
| 4,178,742 | A | | 12/1979 | Longfellow |
| 4,756,145 | A | * | 7/1988 | Pelling ................. A01K 13/006 119/850 |
| 5,093,940 | A | | 3/1992 | Nishiyama |
| 5,406,340 | A | * | 4/1995 | Hoff ........................ A61F 9/027 2/452 |
| 5,410,763 | A | | 5/1995 | Bolle |
| 5,732,415 | A | | 3/1998 | Boyd |
| 5,868,104 | A | * | 2/1999 | Ramirez ................. A01K 13/00 119/850 |
| 6,047,410 | A | | 4/2000 | Dondero |
| 6,311,645 | B1 | | 11/2001 | Brown |
| 6,449,777 | B1 | | 9/2002 | Montague |
| D498,026 | S | * | 11/2004 | Di Lullo ...................... D30/199 |
| 6,863,032 | B2 | | 3/2005 | Di Lullo et al. |
| 6,871,952 | B2 | * | 3/2005 | Pierotti ..................... A61F 9/02 351/157 |
| 7,182,460 | B2 | | 2/2007 | Pierotti |
| 7,581,513 | B2 | | 9/2009 | Di Lullo et al. |
| 2003/0233988 | A1 | * | 12/2003 | Lullo ................... A01K 13/006 119/850 |
| 2010/0083914 | A1 | | 4/2010 | Amaya |

* cited by examiner

*Primary Examiner* — Trinh Nguyen

(74) *Attorney, Agent, or Firm* — Haugen Law Firm PLLP

(57) ABSTRACT

An animal goggle is described that centers and rests upon the maxilla and forehead of the animal. The goggles include a frame, strap system, and a unified interchangeable lens that provides an active animal a full vie and range of motion. The straps are non-obtrusive, also allowing the animal unrestricted movement of the jaw while securely holding the frame against the maxilla and forehead of the animal. The frame includes filtration media and ventilation to reduce condensation and fogging on the lens. The lens allows a full field of view for an active animal while blocking foreign objects such as dust, debris, and ultra violet rays.

20 Claims, 14 Drawing Sheets

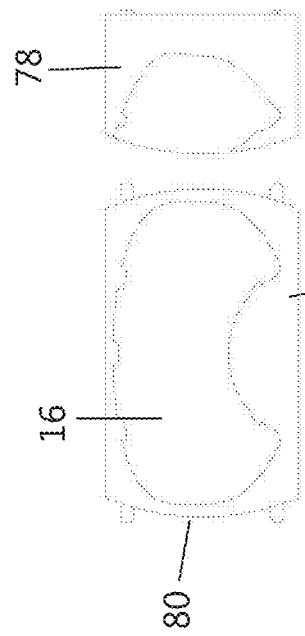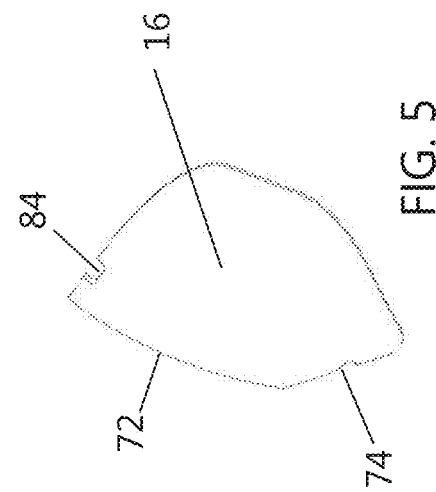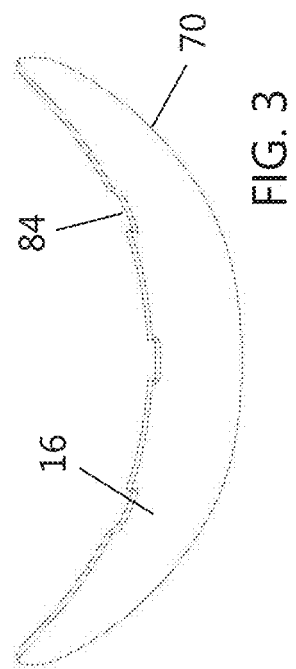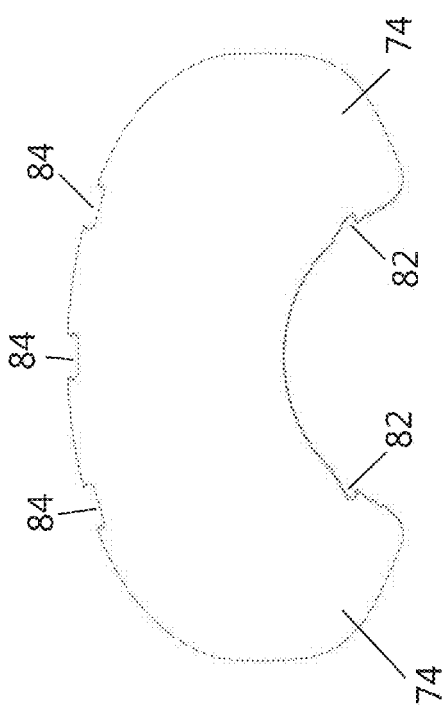

UNIFIED LENS ANIMAL GOGGLE

CROSS-REFERENCE TO RELATED APPLICATIONS

This application claims the filing benefit and priority of U.S. Provisional Patent Application Ser. No. 61/985,287 filed Apr. 28, 2014, the contents of which are incorporated herein by reference in its entirety.

FEDERAL SPONSORSHIP

Not Applicable

JOINT RESEARCH AGREEMENT

Not Applicable

TECHNICAL FIELD

This invention pertains generally to animal eye wear that may be functional protection or a fashionable attire. More particularly, the invention pertains to eye protection or goggles suitable for use by animals that remain secured to the animals head during movement or intense activity.

BACKGROUND

Over the years working animals have been utilized by the military and police to assist the animal's handler with various duties. For example, working dogs have been utilized by K-9 police units to identify contraband, track suspects, and apprehend criminals. Mounted police have employed horses to mobilize their officers over a variety of terrains. Likewise, military personnel have integrated animals as an intricate part of their team. The animals may be required to work in extreme conditions that put the animal's eyes at risk. Some examples of extreme conditions include harsh sunlight, sandstorms, blizzards, and smoke, to name just a few. Eye protection reduces the risk of injury to the animal's eyes, however, these animals often work under extreme conditions and intense activity requiring eyewear that doesn't shift on the animals head during the intense activity. Also, it is desirable to provide the animal with eye protection that may not be incidentally removed by the animal. Further the working animals require eye protection that does not interfere or inhibit the animal's full range of activities including, for example, open mouth breathing, drinking, barking, biting, and panting.

SUMMARY

Embodiments according to aspects of the invention are capable of providing animal goggles that shield the animal's eyes from rain, wind, sun, debris, airborne particles or other undesirable elements. The animal goggles according to the invention provide eye protection without restricting a range of motion thereby allowing the animal to run, breathe, and pant, for example, without inhibition. The multi-directional adjustable strap of the goggles provides a constant tension or force which holds the goggles securely against the animal's maxilla and forehead without inhibiting jaw movement. Further, the contoured frame and unitary lens of the goggles of the present invention secure to the animals face without encroaching upon the eyes, eyebrows or field of vision. The unitary lens may, for example without limitation intended, be translucent, tinted, colored, or a prescription lens.

An embodiment of the animal goggle according to aspects of the invention includes a frame, unified lens and strap assembly. The frame has a lower portion and inner and outer frame portions extending from the lower portion. The inner and outer frames are interconnected with cross-pieces that space apart the inner and outer frame, creating vents between the inner and outer frame. The lower portion of the frame is shaped to rest on the snout or maxilla of the animal and extends over the sides of the snout. A desired shape or contour of the lower frame allows a user to snugly position the lower frame about the snout of the animal. The lower portion may be custom fit or alternatively different sizes and shapes may be constructed to fit various animals. A pad extends around an edge of the inner frame and lower portion of the frame which may contribute to a snug fit on the snout of the animal. The unified lens and frame are further profiled to partially wrap around the animals face in a manner that the vision of the animal remains unobstructed. The frame further includes four connectors to which straps may be coupled. The connectors extend from the frame and form a loop through which a strap may be joined. The connectors are spaced along the frame to further facilitate a snug fit against the animal's face and to limit movement of the goggles on the face while the animal is active.

The strap assembly includes first, second, third and fourth strap segments. A first end of each segment is attached to the frame connectors in a particular arrangement to further enhance the firm positioning of the goggles on the animal. The first strap segment has a first end coupled to the first strap connector of the frame and the other end has a coupling or fastener formed or attached thereto. By way of example, the fastener may be in the form of a buckle or a mating clasp. Similarly, second strap segment has a first end coupled to the third strap connector and the other end includes a fastener that couples or mates with the fastener of the first strap segment. The third strap segment has a first end coupled to the second strap connector of the frame and a second end coupled to the second strap segment. The coupling may be fixed or may allow the first strap segment to slide there through. The fourth strap segment likewise includes a first end coupled to the fourth strap connector of the frame and the other end couples to the first strap segment. The strap segments may include fasteners and buckles that allow for adjusting the length of the strap segments to firmly fit the goggles against the animal's maxilla and forehead. One or more of the strap segments may be further segmented into a stretchable or elastic portion and a rigid or static portion to provide a resilient tension of the goggles against the animal's maxilla and forehead as the animal's jawbone position changes during activity.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

FIG. 3 is a top view of the unified interchangeable lens of the type shown in FIG. 1;

FIG. 4 is a front view of the unified interchangeable lens of the type shown in FIG. 3;

FIG. 5 is a side view of the unified interchangeable lens of the type shown in FIG. 3;

FIG. 6 is a front view of a unified interchangeable lens shown pre-cut from a sheet of lens material;

FIG. 7 is a side view of the pre-cut lens of the type shown in FIG. 6;

DETAILED DESCRIPTION

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The apparatus of the present invention is particularly well suited for providing eye protection or fashionable eyewear for animals such as equestrian or canine eyewear. The animal goggles 10 generally includes a frame 14, unified lens 16 and strap assembly 18. The strap assembly 18 has a four point attachment to the frame 14 which thereby applies a holding force of the goggles against both the snout of the animal and the forehead of the animal. The goggle frame 14 further has a stylish or fashionable appearance best seen in FIGS. 10-18.

Figure 1:
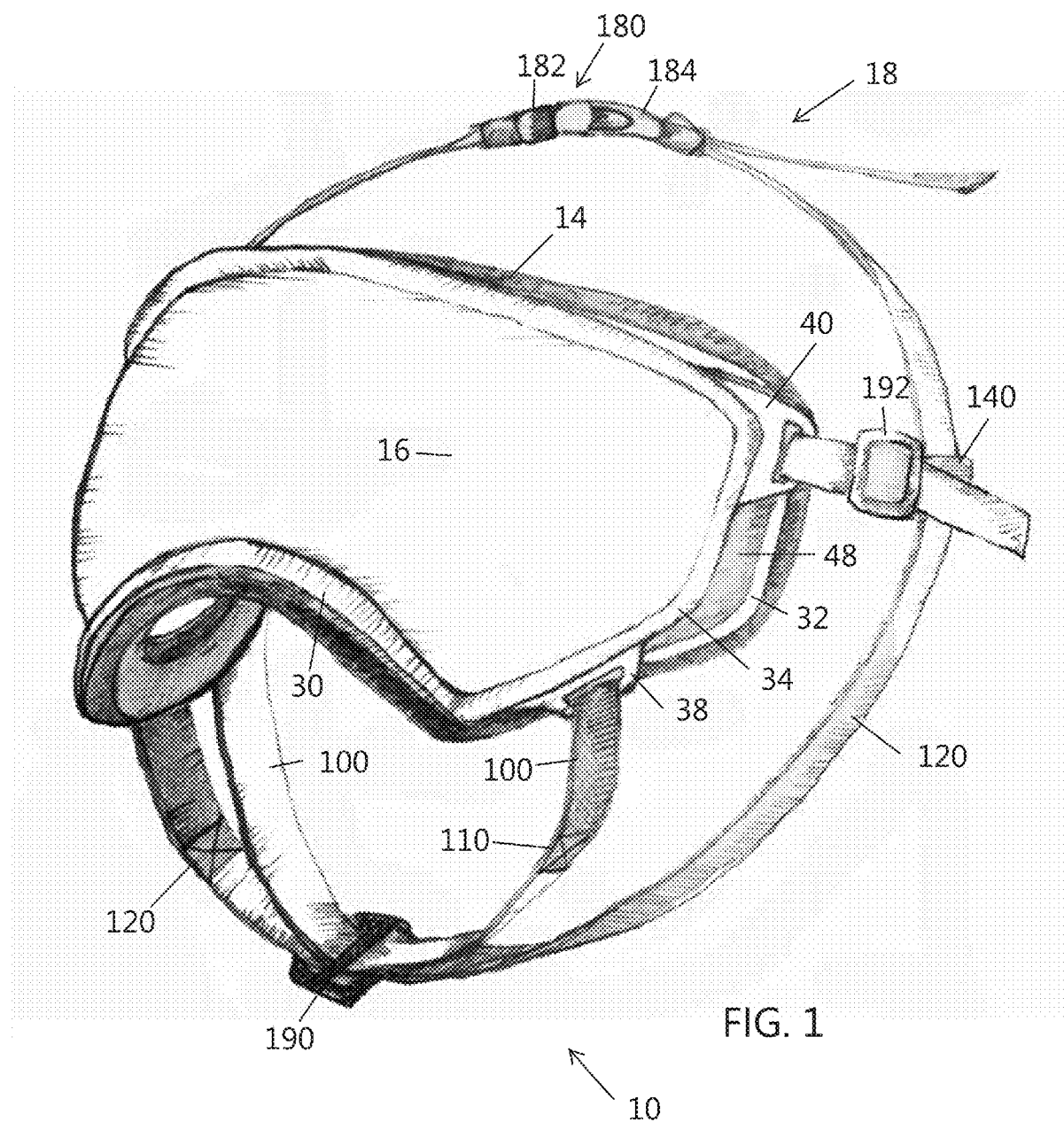
FIG. 1 is a front perspective view of the animal goggles of the present invention.
Figure 2:
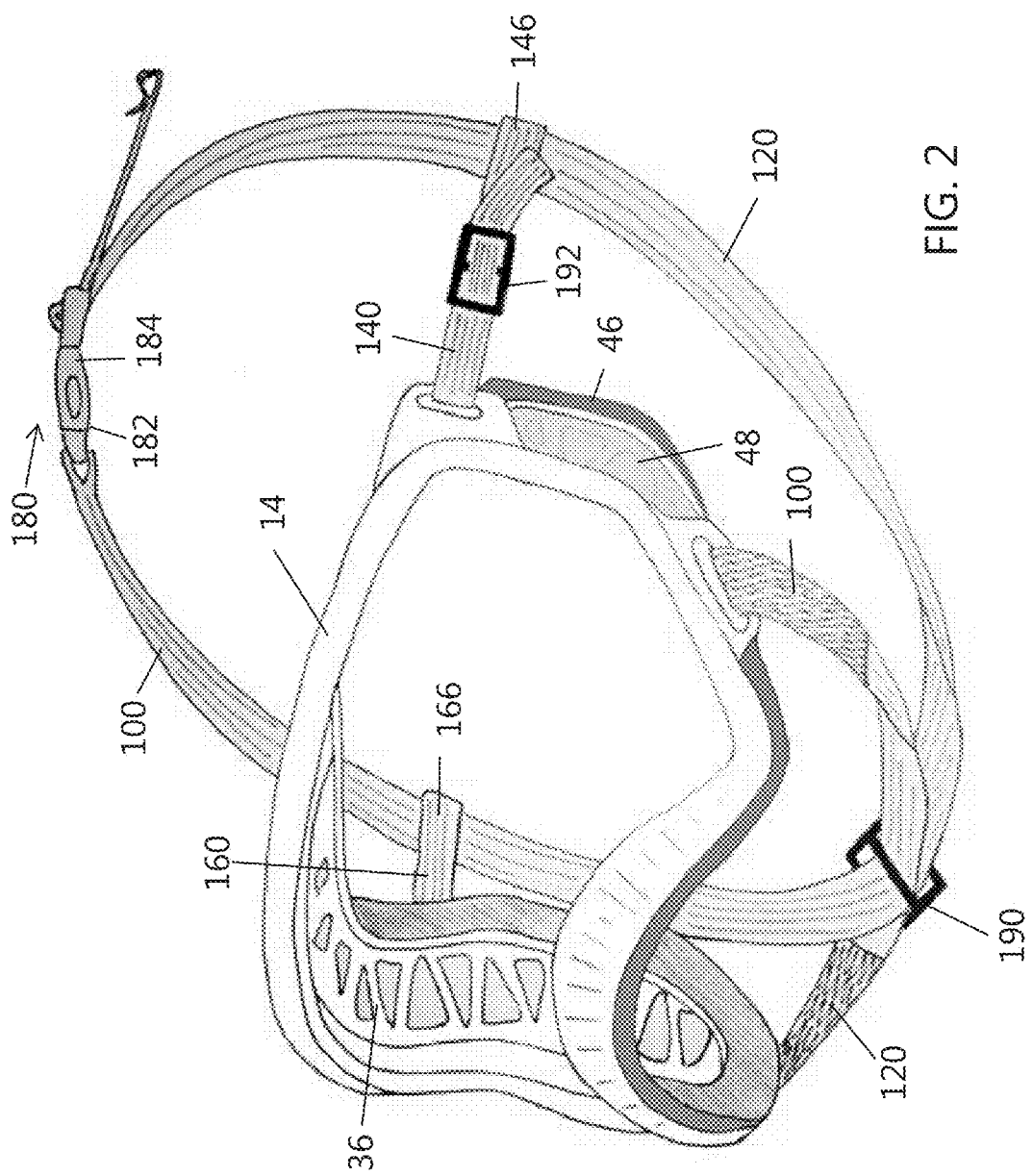
FIG. 2 is a front perspective view of the animal goggles of the present invention having the interchangeable unified lens removed.

With reference to FIGS. 1 and 2 the animal goggles 10 are shown assembled. The goggles 10 includes frame 14, lens 16 and strap assembly 18. A lower portion 30 of the frame 14 is shaped to receive a maxilla or snout of the animal. An inner frame portion 32 and outer frame portion 34 extend upward from the lower frame portion 30. A profile curve 58 of a rim portion 66 of the frame extends about an inside perimeter of the frame. The lower portion of the frame 30 includes profile curves 60 and 62 profiled to fit the facial profile of the animal in a way that the lower portion of the frame 30 fits snuggly on the animal's snout and the remaining portion of the frame fits snug against the sides and forehead of the animal. Padding 46 attached to the inner rim or flange further promotes a snug fit of the goggles 10 on the animal. A filter media, foam, or fabric covers cross-pieces 36 that separate the inner frame 32 and outer frame 34. Ventilation holes 50 are formed between cross-pieces 36 allowing facial heat to escape through the vent holes rather than being trapped between the animal's face and the interior of the goggles. Lens receiving slots 52, 54, and 56 extend about the lower portion and outer portion of the frame. The slots are adapted to receive and retain the unified lens 16 against the frame 14. The lens 16 may be interchangeable and provided with various tints or magnification depending upon the particular intended use of the goggles.

FIGS. 3-7 illustrates the matching profile curve 70 of the lens 16 that snaps into the perimeter slot of the frame 14. The lens includes a first profile angle 72 that is angled from a vertical axis angling from the snout towards the forehead of the animal. Second profile angle 74 angles down and outward from a horizontal axis to wrap about the snout of the animal. Stated otherwise, the lens includes a curved profile both from side to side and from top to bottom. Without limitation intended, the lens 16 may be stamped, die cut, or otherwise formed from a UV tinted polycarbonate sheet material 76, for example, that is both curved radially 78 and curved vertically 80 from top to bottom. Curved indents or slots 82 engage tabs extending from within the slot portion 54 of slot 52 to secure a lower portion of the lens to the frame 14. Similarly, curved indents or slots 84 are formed in an upper portion of the lens and engage tabs extending from within upper slot portion 56 of slot 52. Those skilled in the art will appreciate that the slots 84 may be formed larger than the corresponding tabs to reduce effects of convection on the lens.

Figure 8:
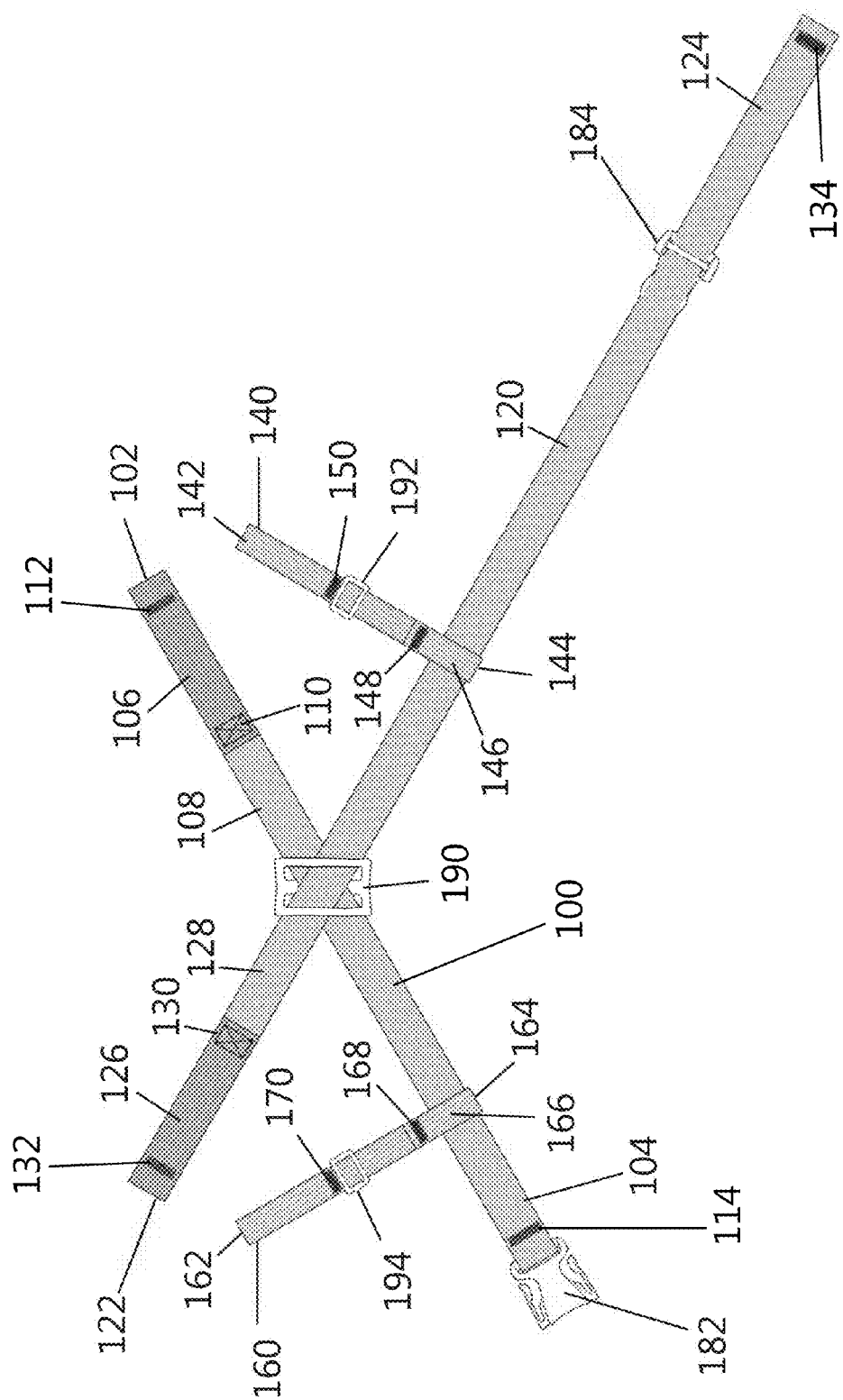
FIG. 8 is a top plan view of the strap assembly of the type shown in FIG. 1.
Figure 9:
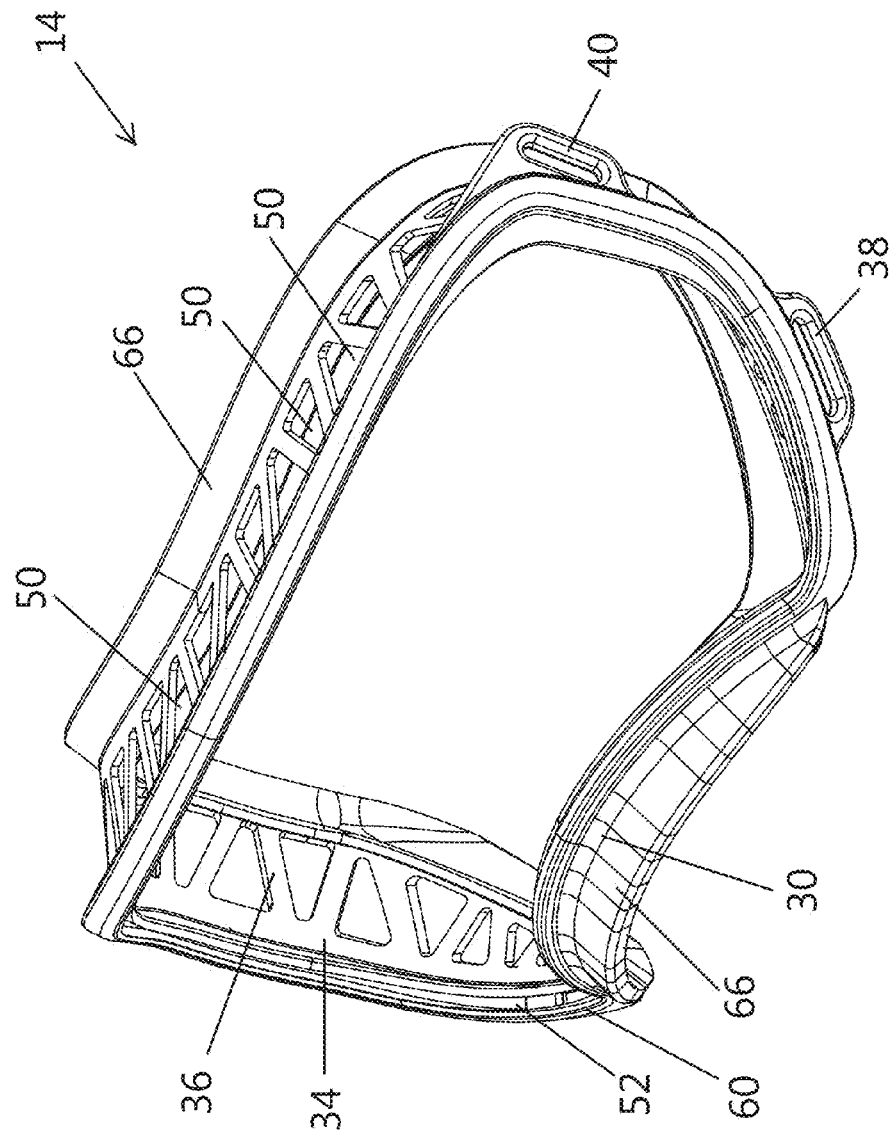
FIG. 9 is a front right perspective view of the frame of the type shown in FIG. 1.
Figure 10:
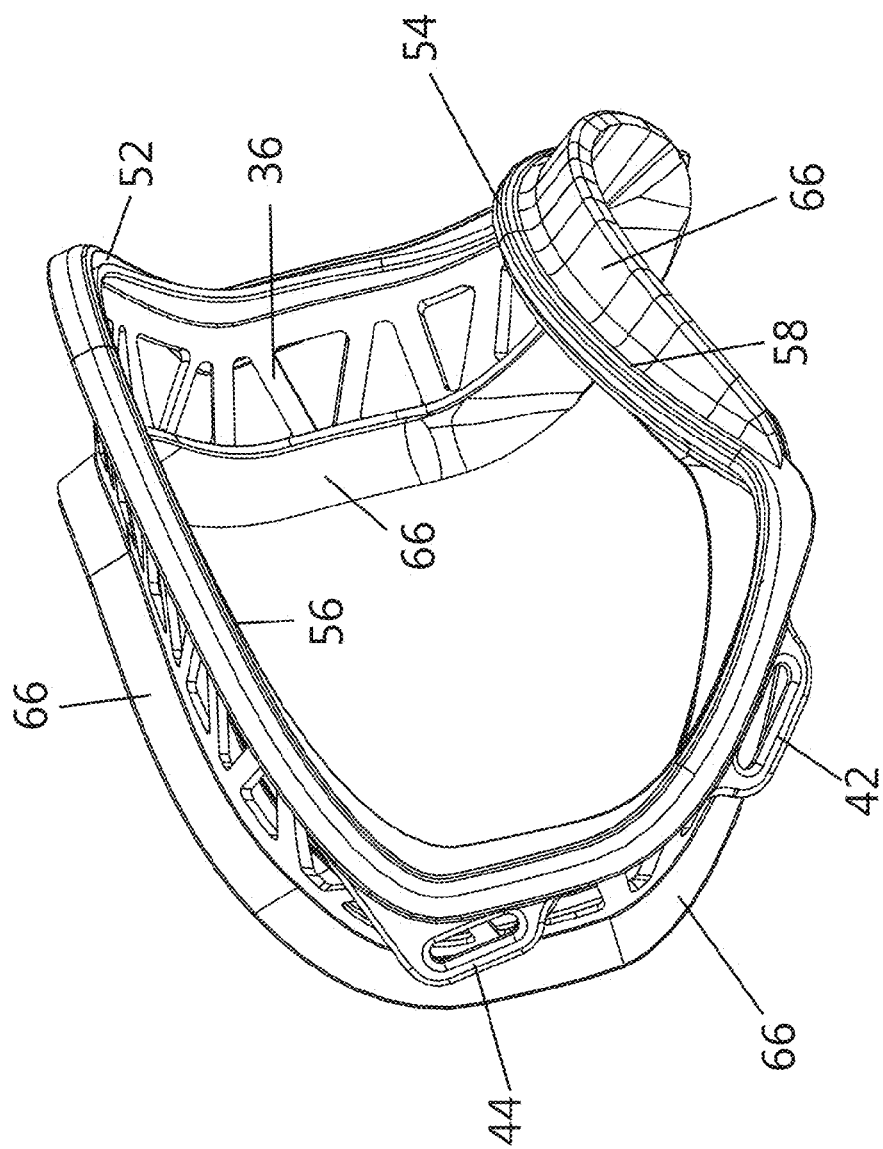
FIG. 10 is a front left perspective view of the frame of the type shown in FIG. 9.
Figure 11:
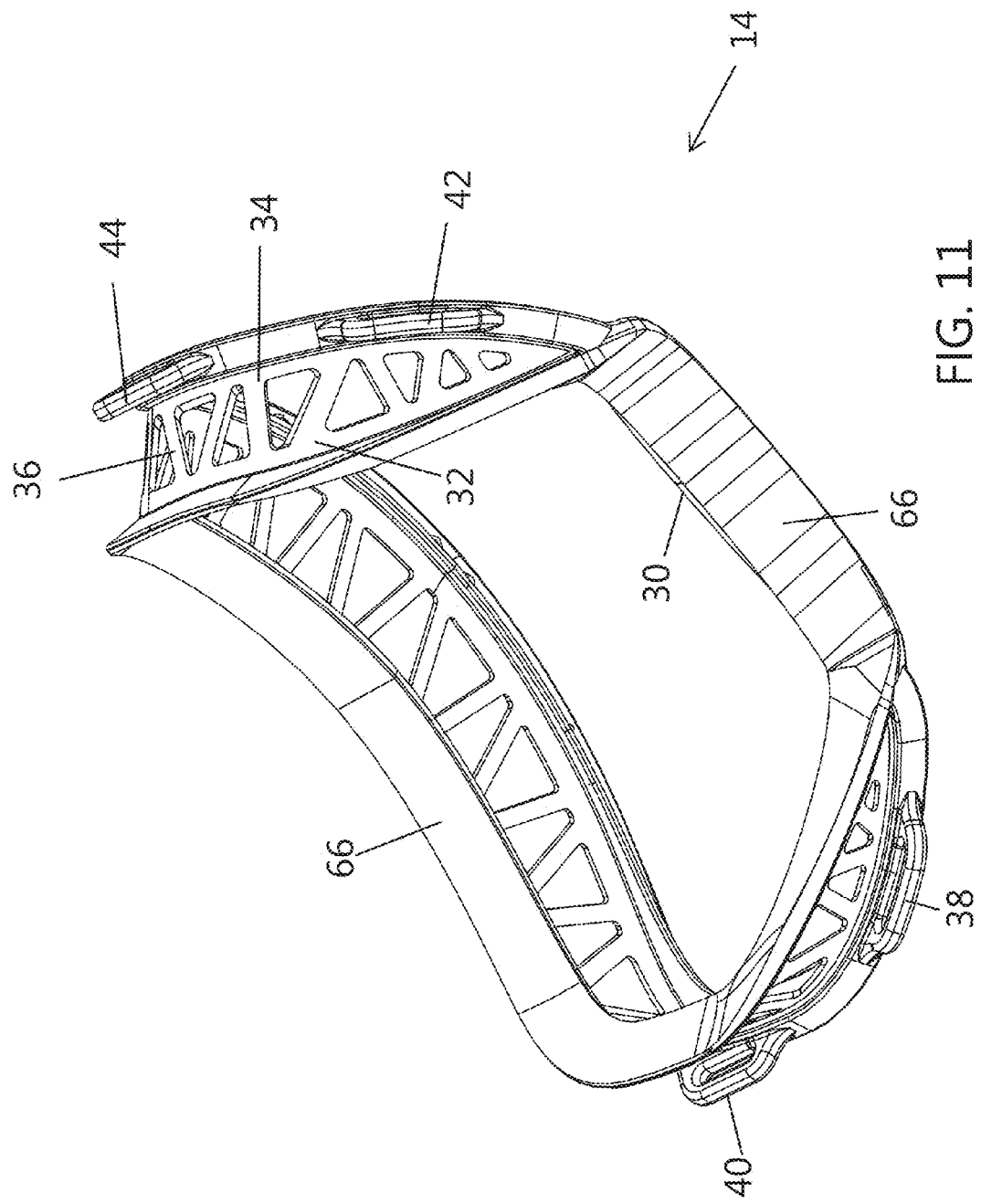
FIG. 11 is a bottom left back perspective view of the frame of the type shown in FIG. 9.
Figure 12:
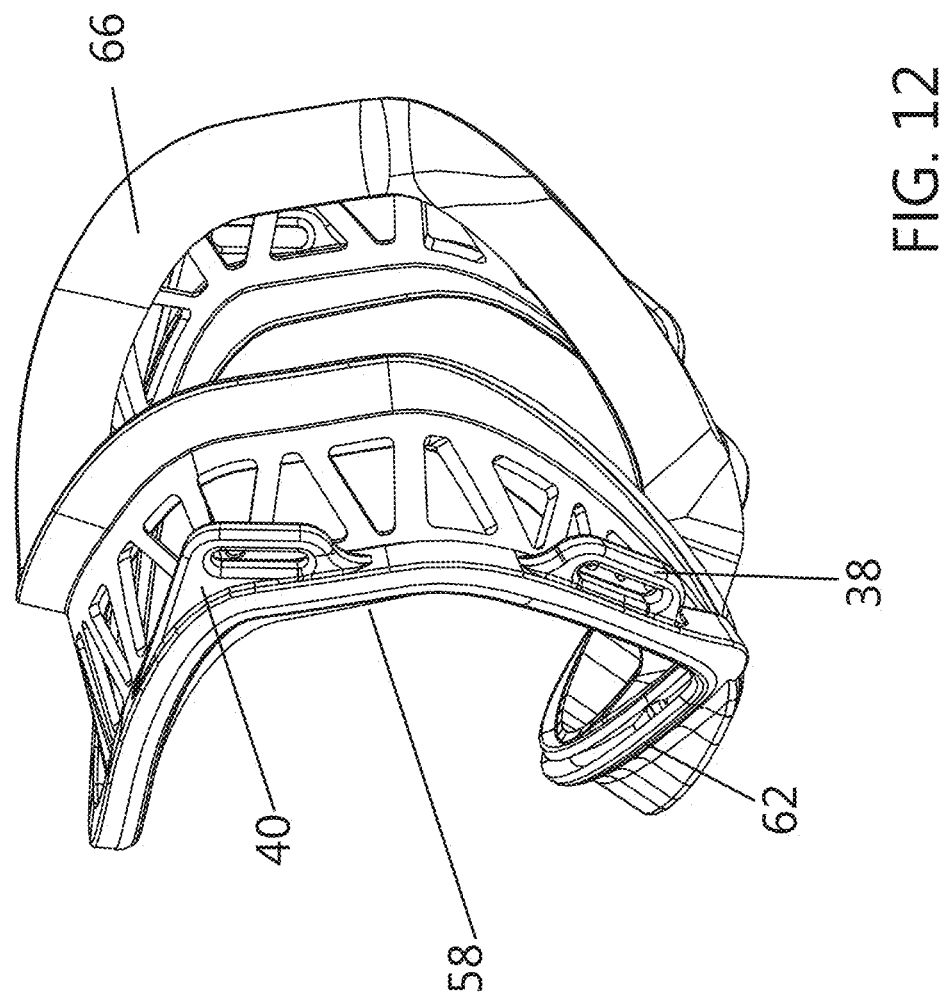
FIG. 12 is a right back perspective view of the frame of the type shown in FIG. 9.
Figure 13:
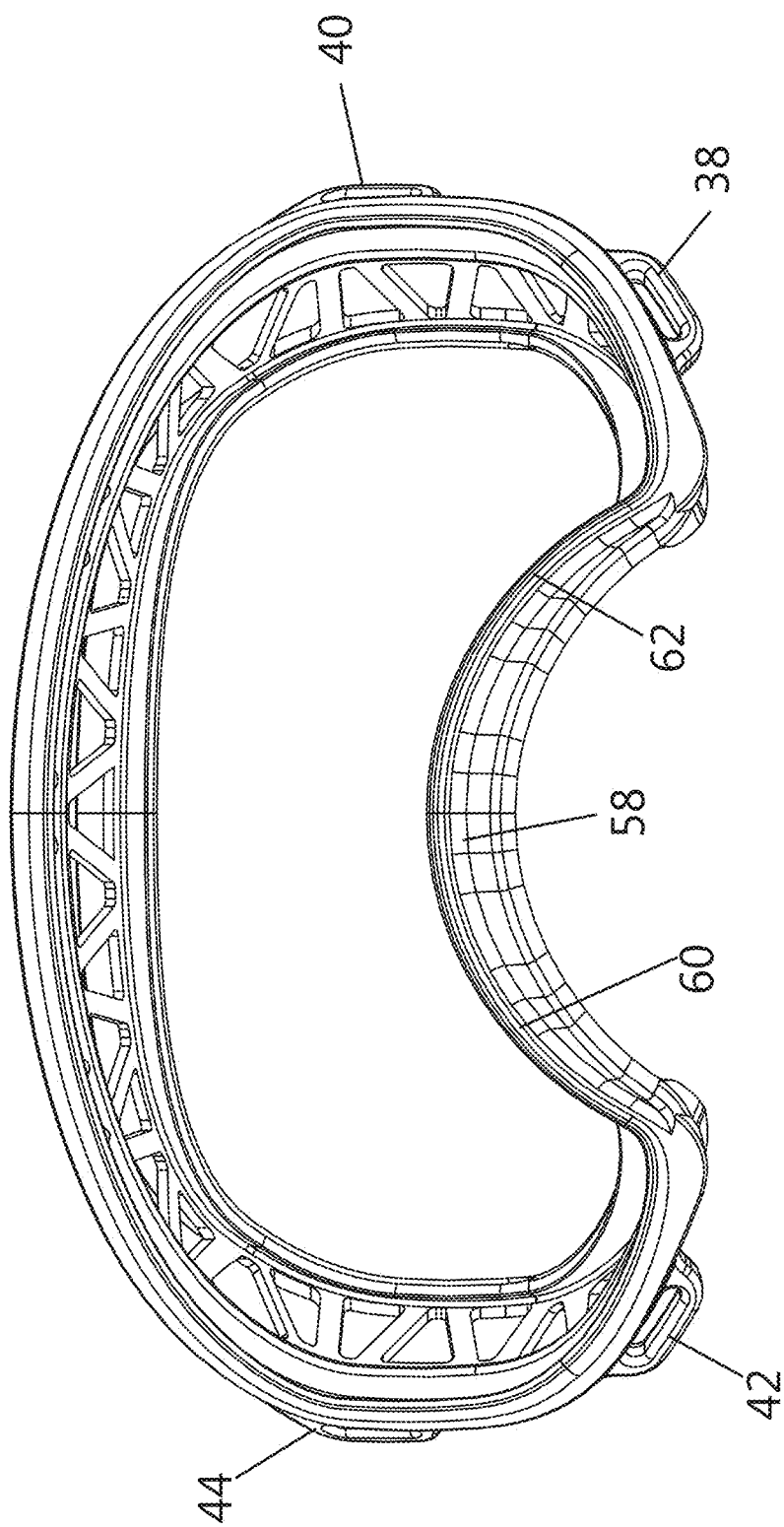
FIG. 13 is a front view of the frame of the type shown in FIG. 9.
Figure 14:
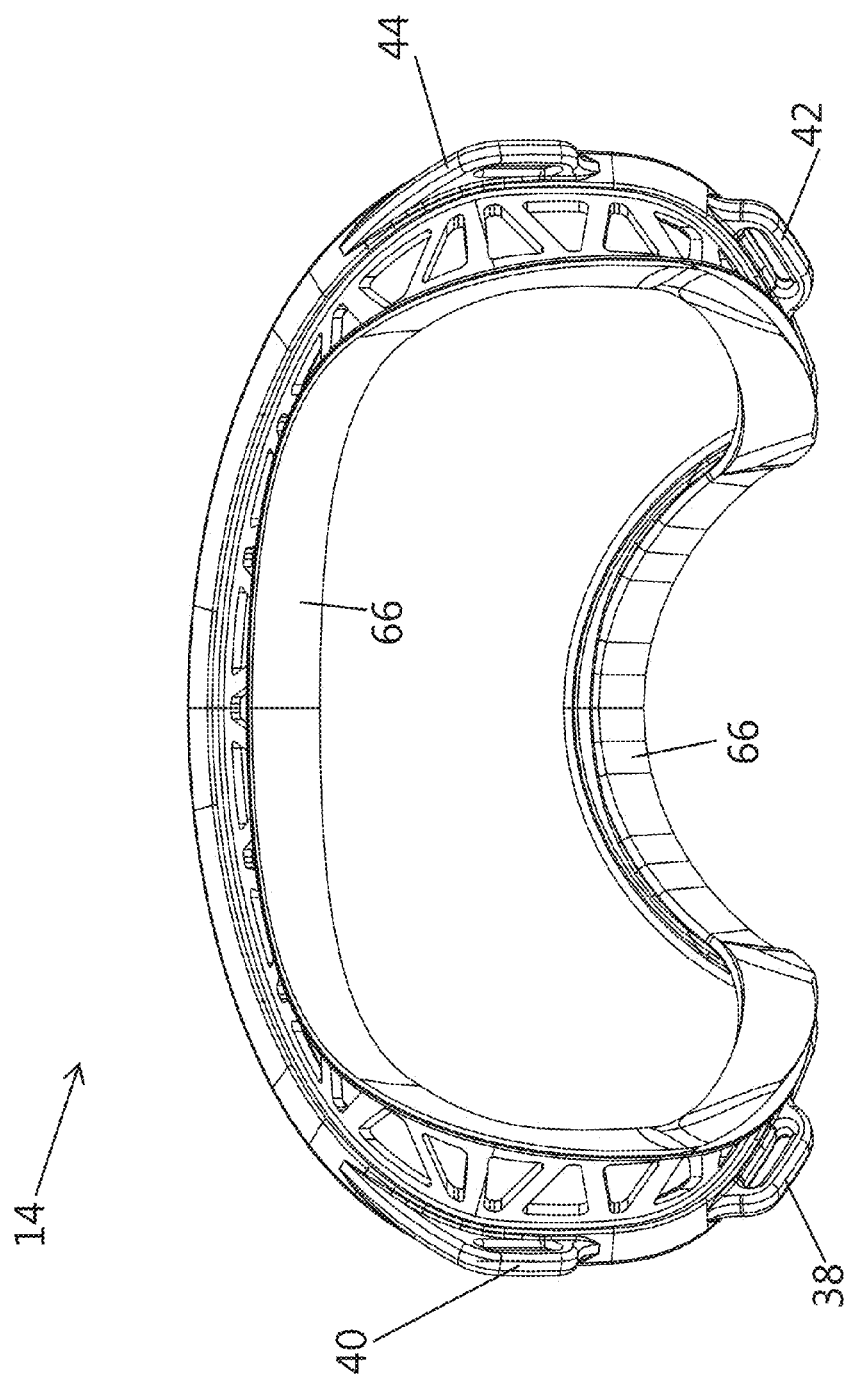
FIG. 14 is a back view of the frame of the type shown in FIG. 9.
Figure 15:
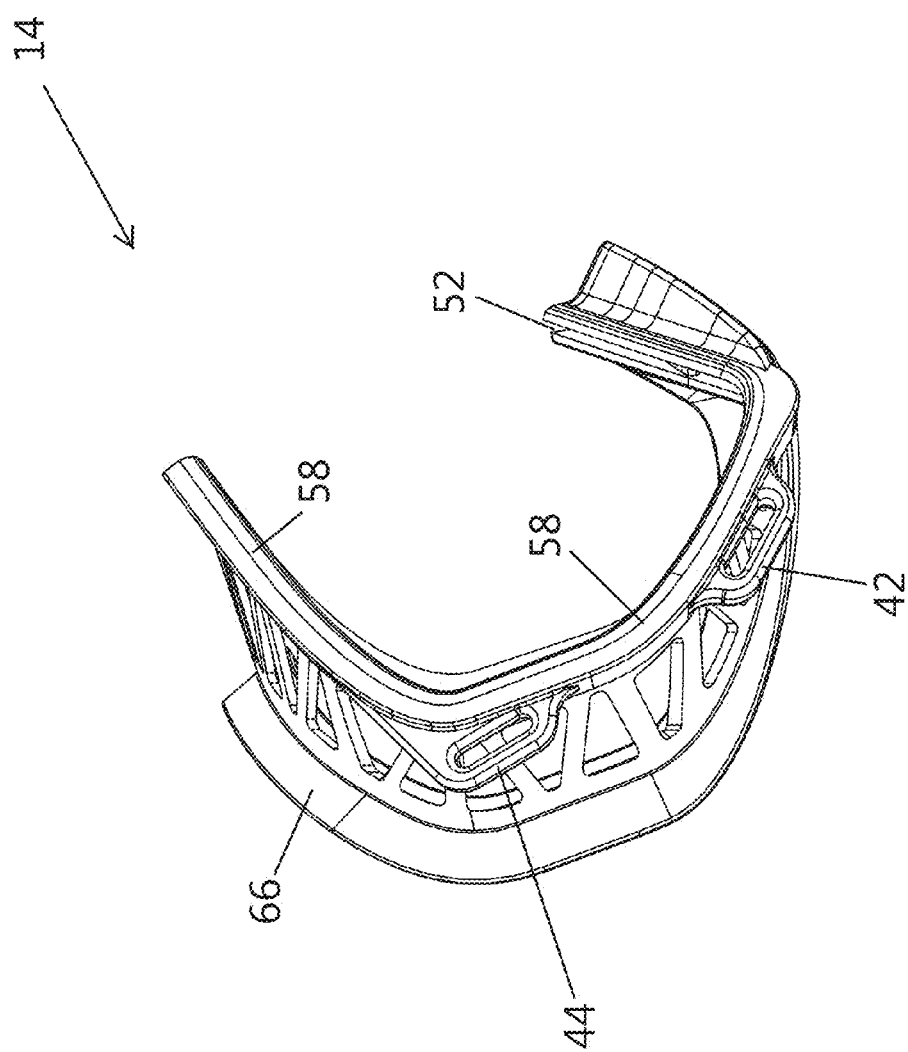
FIG. 15 is a left side view of the frame of the type shown in FIG. 9.
Figure 16:
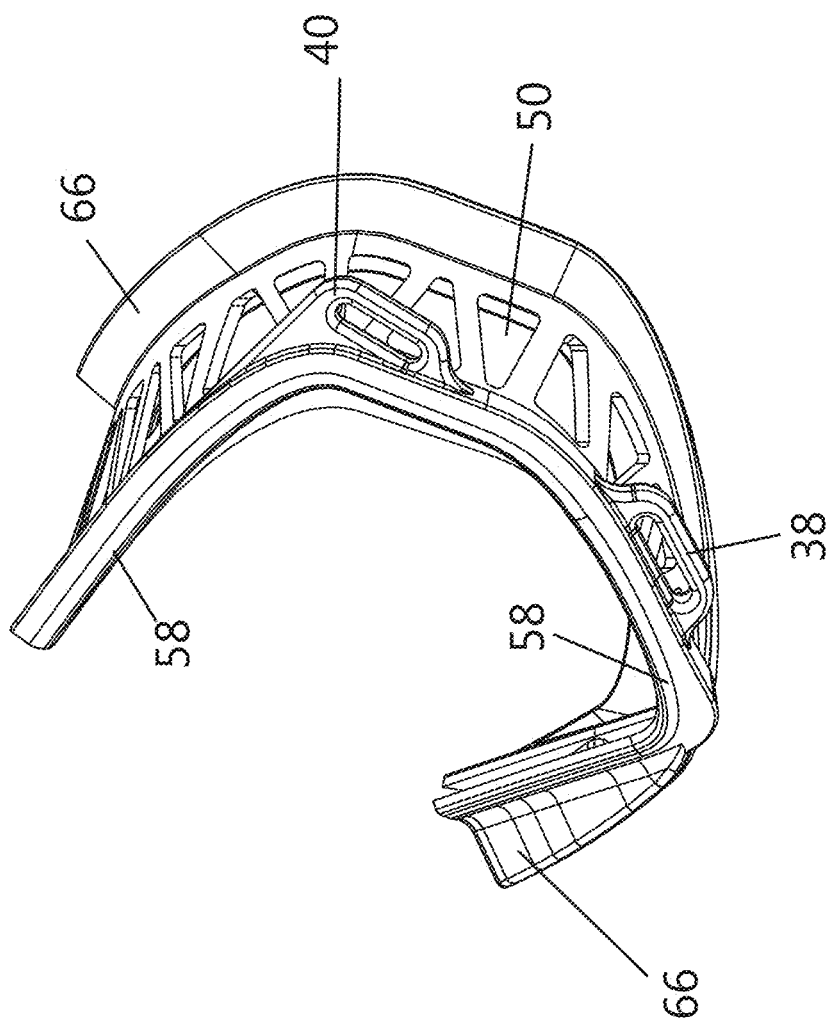
FIG. 16 is a right side view of the frame of the type shown in FIG. 9.
Figure 17:
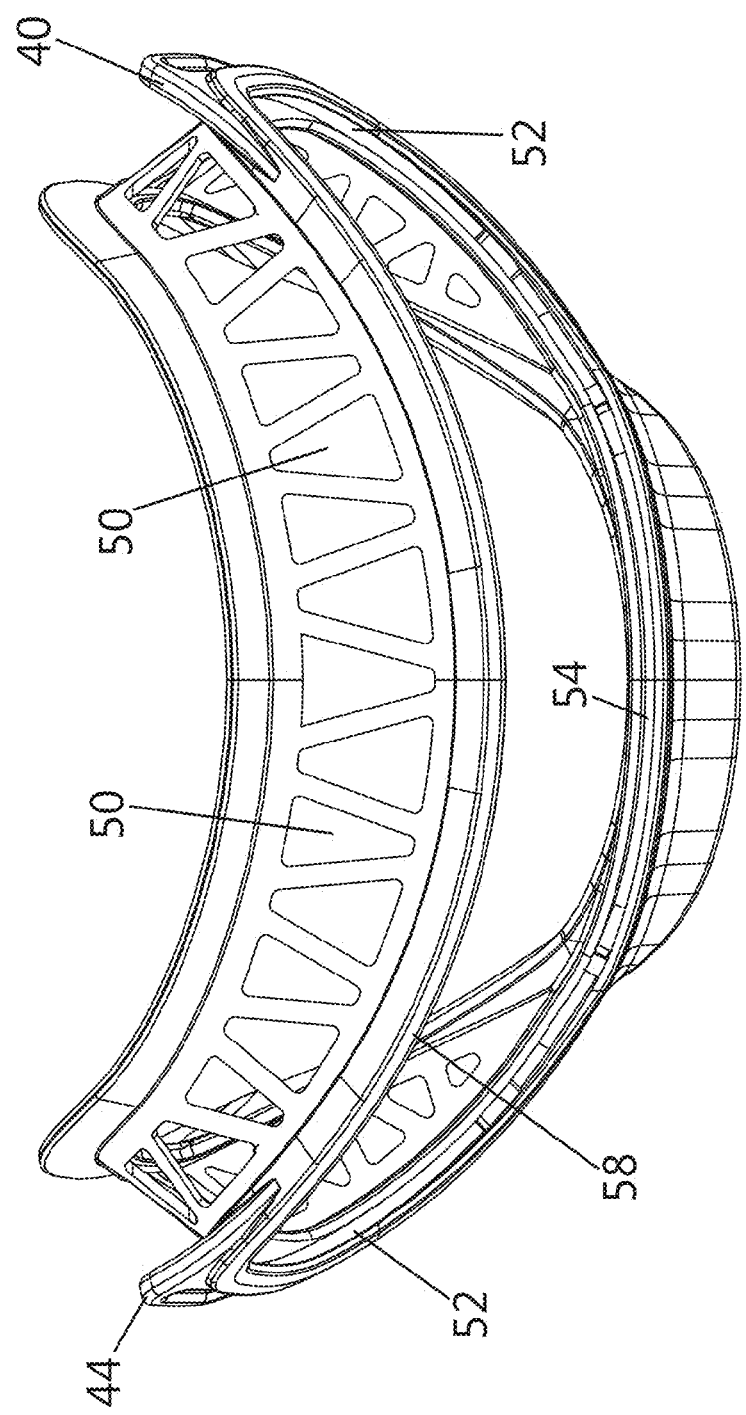
FIG. 17 is a top view of the frame of the type shown in FIG. 9.
Figure 18:
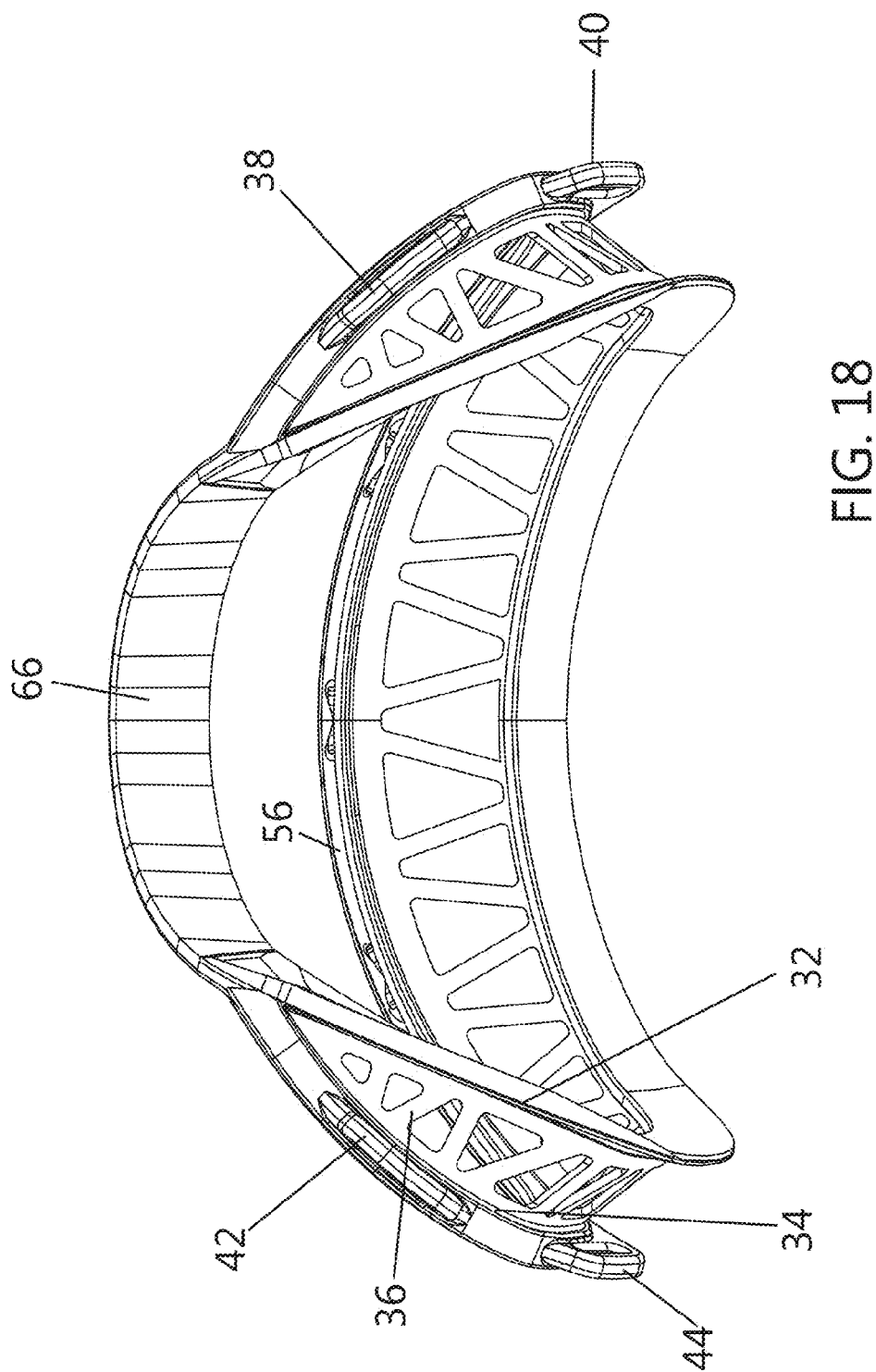
FIG. 18 is a bottom view of the frame of the type shown in FIG. 9.

With reference to FIGS. 1, 2, and 8 the strap assembly 18 includes first strap segment 100, second strap segment 120, third strap segment 140, and fourth strap segment 160. The straps may be constructed of a webbing, leather strapping or other suitable known material. First strap segment 100 includes first strap end 102 and opposing second end 104. The first strap end includes a stretchable portion 106 coupled to a static portion 108 of the strap 100. Stretchable portion 106 and static portion 108 may be coupled together with stitching 110. When the goggles are fitted on the animal a slight stretch to the stretchable portion 106 pulls the goggles towards the animals face. A first fastener half 182 of fastener 180 is attached to the second end 104 of the strap 100. The first end 102 of the strap is coupled about a first strap connector 38 extending from the frame 14. The strap may be coupled about the connector 38 by overlapping the strap about the connector and sewing the end to the strap with stitching 112. Similarly, the second end 104 of the strap segment 100 may be coupled to fastener half 182 by overlapping and sewing the end of the strap to itself with stitching 114. Of course other suitable couplings may be used to affix the ends of the strap to corresponding fastener 182 and connector 38.

Second strap segment 120 includes a first strap end 122 and opposing second end 124. The first strap end includes a stretchable portion 126 coupled to a static portion 128 of the strap 120. Stretchable portion 126 and static portion 128 may be coupled together with stitching 130. When the goggles are fitted on the animal a slight stretch to the stretchable portion 126 pulls the goggles towards the animals face. A second fastener half 184 of fastener 180 is attached to the second end 124 of the strap 120. The first end 122 of the strap is coupled about a third strap connector 42 extending from the frame 14. The strap may be coupled about the connector 42 by overlapping the strap about the connector and sewing the end to the strap with stitching 132. The second end 124 may slip through the fastener and the length may be adjustable with the use of a weblock coupled to or integrated with the fastener 184. The second end 124 of the strap may be overlapped and sewn to itself with stitching 134. In this manner the overlap may restrict the end 124 from slipping back through the weblock of the fastener 184. Of course other suitable couplings may be used to affix the ends of the strap to corresponding fastener 184 and connector 42. The fastener 180 and its corresponding first and second halves 182 and 184 may comprise, for example without limitation intended, a side release buckle that allows for adjusting the length of the strap coupled to the fastener. Straps 100 and 120 extend through a weblock or tri-glide 190 to thereby interconnect the first and second straps under the chin portion of the animal.

Third strap segment 140 includes first strap end 142 and opposing second end 144. The first strap end may loop about frame connector 40 and couple to itself with a tri-glide 192. Stitching 150 may be utilized to keep the tri-glide 192 from slipping off the strap. The opposing end 144 may be looped and coupled to itself with stitching 148 to form loop 146 through which second strap 120 may slide. When the goggles are fitted on the animal, the second strap slips within loop 146 and the first end 142 may be pulled to adjust the length of strap 140 and further engage the goggle to the face of the animal.

Similarly, fourth strap segment 160 includes a first strap end 162 and opposing second end 164. The first strap end may loop about fourth strap frame connector 44 and couple to itself with a tri-glide 194. Stitching 170 may be utilized to keep the tri-glide 194 from slipping off the strap. The opposing end 164 may be looped and coupled to itself with stitching 168 to form loop 166 through which first strap 100 may slide. When the goggles are fitted on the animal, the first strap slips within loop 166 and the first end 162 may be pulled to adjust the length of strap 160 and further engage the goggle to the face of the animal.

In use, a user positions the snout of the animal between the lower portion of the frame 30 and the tri-glide 190 interconnecting first and second straps 100 and 120. The goggle frame and straps are then slid over the snout and positioned against the face of the animal. First strap segment 100, third strap segment 140 and fourth strap segment 160 may be pulled or lengthened to provide a snug fit of the goggles against the animal's face.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. An animal goggle comprising:
   a frame having a lower portion shaped to receive a maxilla, an inner frame portion extending from the maxilla receiving lower portion, an outer frame portion extending from the maxilla receiving lower portion, and cross-pieces interconnecting the inner frame portion and outer frame portion;
   a unified lens coupled to said outer frame portion of said frame;
   first and second strap connectors extending from a first side of said frame;
   third and fourth strap connectors extending from a second side of said frame;
   a strap assembly having first, second, third and fourth strap segments; and
   said first strap segment having a first end coupled to said first strap connector of said frame and a second end including a first half of a fastener;
   said second strap segment having a first end coupled to said third strap connector of said frame and a second end including a second half of the fastener;
   said third strap segment having a first end coupled to said second strap connector of said frame and a second end coupled to said second strap segment; and
   said fourth strap segment includes a first end coupled to said fourth strap connector of said frame and a second end coupled to said first strap segment.

2. The animal goggle as recited in claim 1, further including a padding on said inner frame.

3. The animal goggle as recited in claim 1, wherein the fastener is of a side release buckle type.

4. The animal goggle as recited in claim 1, wherein lengths of said second, third and fourth strap segments are adjustable.

5. The animal goggle as recited in claim 1, further including a tri-glide weblock interconnecting said first and second strap segments.

6. The animal goggle as recited in claim 1, further including a filter media coupled to said cross pieces between said inner and outer frame portions of said frame.

7. The animal goggle as recited in claim 1, wherein said unified lens includes a profile contour that curves from said maxilla receiving lower portion of said frame to an upper portion of said outer frame and further curves between sides of said outer frame.

8. The animal goggle as recited in claim 1, wherein the first end of said first strap segment includes a stretchable portion of the first strap segment.

9. The animal goggle as recited in claim 1, wherein the first end of said second strap segment includes a stretchable portion of the second strap segment.

10. An animal goggle comprising:
    a frame having a lower portion shaped to receive a maxilla, an inner frame portion extending from the maxilla receiving lower portion, an outer frame portion extending from the maxilla receiving lower portion, and cross-pieces interconnecting the inner frame portion and outer frame portion;

a unified lens coupled to said outer frame portion of said frame;

first and second strap connectors extending from a first side of said frame;

third and fourth strap connectors extending from a second side of said frame;

a strap assembly having first, second, third and fourth strap segments;

said first strap segment having first and second ends wherein said first end of said first strap segment is stretchable and couples to said first strap connector of said frame and said second end of said first strap segment includes a first half of a buckle;

said second strap segment having first and second ends wherein said first end of said second strap segment is stretchable and couples to said third strap connector of said frame and said second end of said second strap segment includes a second half of the buckle;

said third strap segment includes a first end coupled to said second strap connector of said frame and a second end coupled to said second strap segment; and said fourth strap segment includes a first end coupled to said fourth strap connector of said frame and a second end coupled to said first strap segment.

11. The animal goggle as recited in claim 10, further including a padding on said inner frame.

12. The animal goggle as recited in claim 10, wherein lengths of said second, third and fourth strap segments are adjustable.

13. The animal goggle as recited in claim 10, further including a tri-glide weblock interconnecting said first and second strap segments.

14. The animal goggle as recited in claim 10, further including a filter media coupled to said cross pieces between said inner and outer frame portions of said frame.

15. The animal goggle as recited in claim 10, wherein said unified lens includes a profile contour that wraps around said outer frame portion and said maxilla receiving lower portion of said frame.

16. An animal goggle comprising:

a frame having a lower portion shaped to receive a maxilla, an inner frame portion extending from the maxilla receiving lower portion, an outer frame portion extending from the maxilla receiving lower portion, and cross-pieces interconnecting the inner frame portion and outer frame portion;

a unified lens coupled to said outer frame portion of said frame, said unified lens includes a profile contour that wraps around said outer frame portion and said maxilla receiving lower portion of said frame;

first and second strap connectors extending from a first side of said frame;

third and fourth strap connectors extending from a second side of said frame;

a strap assembly having first, second, third and fourth strap segments;

said first strap segment having first and second ends wherein said first end of said first strap segment is stretchable and couples to said first strap connector of said frame and said second end of said first strap segment includes a first half of a buckle;

said second strap segment having first and second ends wherein said first end of said second strap segment is stretchable and couples to said third strap connector of said frame and said second end of said second strap segment includes a second half of the buckle;

said third strap segment includes a first end coupled to said second strap connector of said frame and a second end coupled to said second strap segment; and said fourth strap segment includes a first end coupled to said fourth strap connector of said frame and a second end coupled to said first strap segment.

17. The animal goggle as recited in claim 16, further including a padding on said inner frame.

18. The animal goggle as recited in claim 16, wherein lengths of said second, third and fourth strap segments are adjustable.

19. The animal goggle as recited in claim 16, further including a tri-glide weblock interconnecting said first and second strap segments.

20. The animal goggle as recited in claim 16, further including a filter media coupled to said cross pieces between said inner and outer frame portions of said frame.

\* \* \* \* \*